United States Patent [19]
Lund

[11] Patent Number: 5,385,168
[45] Date of Patent: * Jan. 31, 1995

[54] HOT WATER DEMAND APPLIANCE AND SYTEM

[75] Inventor: William J. Lund, Stockton, Calif.

[73] Assignee: ACT Distribution, Inc., Newport Beach, Calif.

[ * ] Notice: The portion of the term of this patent subsequent to Jan. 11, 2011 has been disclaimed.

[21] Appl. No.: 135,723

[22] Filed: Oct. 5, 1993

Related U.S. Application Data

[63] Continuation-in-part of Ser. No. 695,609, May 3, 1991, Pat. No. 5,277,219.

[51] Int. Cl.6 ............................................. F16K 49/00
[52] U.S. Cl. ................................... 137/337; 126/362; 417/32
[58] Field of Search ................ 137/337, 387; 126/362; 417/32

[56] References Cited
U.S. PATENT DOCUMENTS

| | | |
|---|---|---|
| 4,321,943 | 3/1982 | Haws ..................................... 137/337 |
| 4,606,325 | 8/1986 | Lujan et al. ............................ 417/32 |
| 4,696,171 | 9/1987 | Babuin .................................. 137/387 |
| 4,750,472 | 6/1988 | Fazekas ................................. 126/362 |
| 4,798,224 | 1/1989 | Haws .................................... 137/337 |
| 4,945,942 | 8/1990 | Lund .................................... 137/337 |
| 5,042,524 | 8/1991 | Lund .................................... 137/337 |

*Primary Examiner*—A. Michael Chambers
*Attorney, Agent, or Firm*—Walter A. Hackler

[57] ABSTRACT

A hot water appliance is provided with an accelerated delivery system which includes a pump interconnected between hot and cold water fittings and a control system for causing the pump to circulate water from the hot water fitting into the cold water fitting when the hot water appliance is turned on. Temperature sensor is provided for causing the control system to stop the pump to prevent heated water from being circulated into the cold water fitting. In addition, a hot water demand system may incorporate a sound sensor detecting water flow in a hot water delivery line and a sound-generating element may be provided for providing a characteristic sound in response to water flow in the hot water delivery line.

11 Claims, 2 Drawing Sheets

HOT WATER DEMAND APPLIANCE AND SYTEM

This application is a continuation-in-part of U.S. Ser. No. 07/695,609 filed May 3, 1991, now U.S. Pat. No. 5,277,219.

The present invention is generally directed to plumbing systems and appliances and more particularly directed to plumbing systems and appliances of high thermal efficiency.

As described in U.S. Pat. Nos. 4,321,943 and 4,798,224, a considerable amount of thermal energy may be wastefully dissipated from hot water lines which provide hot water to plumbing fixtures, such as domestic wash basins, dishwashers and clothes washers. In addition, if water is allowed to run down the drain while waiting for hot water to be delivered to the fixture from a remote hot water source, a substantial water loss may occur.

In order to reduce such water loss, plumbing systems have been devised which continuously circulate hot water from a hot water source to the fixture and back to the hot water source. In this arrangement, a supply of hot water is always adjacent to a plumbing fixture despite the remote position of the hot water source. The water loss is then limited to the amount of cold water disposed in draw pipes interconnecting the plumbing fixture to the hot water conduit in which hot water is circulated.

While this system substantially reduces the amount of water which must be withdrawn from the fixture before suitable hot water is obtained, it is not energy efficient because the array of pipes interconnecting the plumbing fixtures in the hot water source provide an enormous surface area for thermal radiation therefrom. In addition, the electrical cost of running a circulating pump may cause such system to be prohibitive in view of the latest energy conscious code requirements of most governmental agencies.

Thermal losses in both circulating and noncirculating plumbing systems have been reduced by insulation of the hot water lines as well as the hot water heaters which feed the plumbing fixtures. While such insulation slows the dissipation of heat, no savings occur over an extended period of time in noncirculating systems because intermittent use of hot water through the lines still allows hot water to cool to ambient temperatures. In circulating systems, of course, there is a continual thermal loss.

With specific reference to noncirculating systems, devices have been developed to actually recover the hot water remaining in the hot water lines after the use of a fixture by drawing the hot water back into the hot water tank; e.g., see U.S. Pat. Nos. 4,321,943 and 4,798,224. Because hot water is removed from the lines, there is an actual reduction in the amount of heat loss rather than just a slowing of heat loss as occurs through the use of insulation alone.

U.S. Pat. No. 5,042,524 is directed to an accelerated hot water delivery system which substantially reduces thermal losses by providing intermittent circulation through the hot water lines.

The present invention utilizes the cold water line as a return line for a hot water loop. This enables the present invention to be readily retrofitted into existing homes without the need for the installation of a return line to the hot water heater. Hence, substantial installation costs are eliminated.

SUMMARY OF THE INVENTION

A hot water appliance in accordance with the present invention, which includes an accelerated hot water delivery system, comprises an appliance utilizing hot water and having fittings for both hot and cold water, along with pump means, interconnected between the hot and cold water fittings for circulation of water from the hot water fitting into the cold water fitting.

Control means are provided for causing the pump to circulate water from the hot water fitting into the cold water fitting when the hot water appliance is turned on and a temperature sensor, connected to the control means, is provided for causing the control means to stop the pump means to prevent heated water from being circulated into the cold water fitting.

Manual switch means may be provided for causing the control means to turn on the pump means and, alternatively, flow detection means may be provided for detecting water flow through the hot water fitting and, in response thereto, causing the control means to turn on the pump means.

Another embodiment of the present invention is a hot water demand system generally including a hot water source and hot water delivery lines connected between the hot water source and at least one plumbing fixture. A cold water delivery line is provided and connected between the plumbing fixture and a cold water source and the hot water source for delivering cold water thereto.

Pump means are provided which are interconnected between the hot and cold water delivery lines, for circulation of the water from the hot water delivery line through the cold water delivery and into the hot water source.

Sound sensing means is provided for detecting water flow in the hot water delivery line and generating a control signal. A control system provides means for causing the pump to circulate water from the hot water line into the cold water line and back to the hot water source in response to the sound sensing means control signal.

A temperature sensor, connected to the control system, provides a means for causing the control system to stop the pump to prevent heated water from being circulated to the cold water delivery lines.

In this manner, the cold water delivery lines are used as a return loop for water to the hot water source, which eliminates the need for installation of a separate return line as is common in circulation water systems. Hence, the apparatus of the present invention may be readily installed adjacent to one plumbing fixture in an existing system without the installation of additional plumbing return lines which requires substantial modification to an existing plumbing system, entailing the removal of wallboard and/or plaster for installation within walls and cutting into concrete foundation slabs.

In one embodiment of the present invention, a means for generating a characteristic sound in response to water flow in the hot water line, the sound sensing means may be configured for sensing the characteristic sound through the hot water delivery line.

The temperature sensor in one embodiment of the present invention may be disposed in a water line connecting the hot water delivery line to the pump and may be configured for detecting a selected water temperature and in response thereto, causing the control system to stop the pump. Alternatively, the temperature sensor may be adapted for detecting a temperature increase, or gradient, and a response thereto causing the control system to stop the pump.

BRIEF DESCRIPTION OF THE DRAWINGS

The advantages and features of the present invention will appear from the following description when considered in conjunction with the accompanying drawings, in which.

DETAILED DESCRIPTION OF THE DRAWINGS

Figure 1:
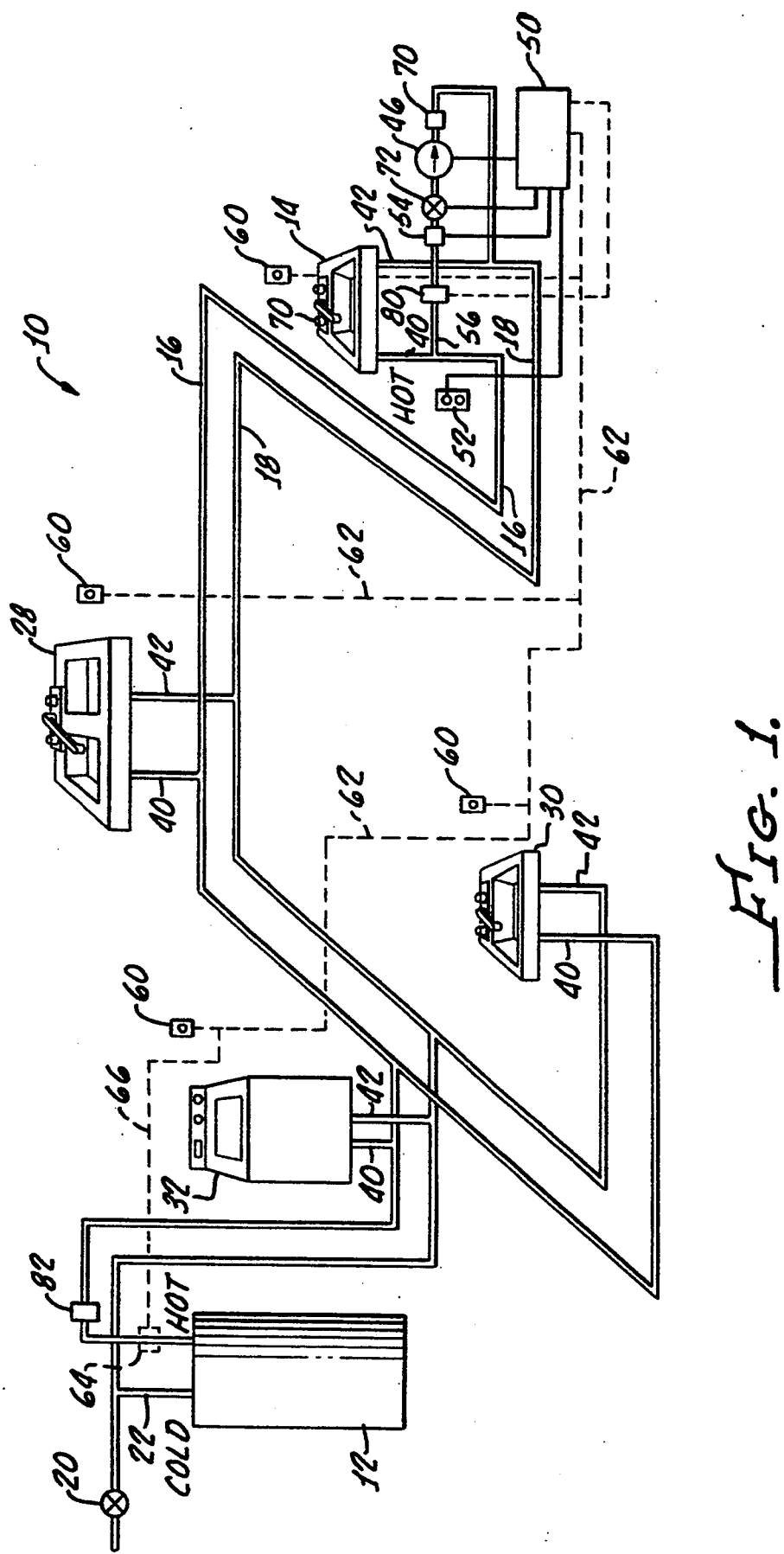
FIG. 1 is a flow diagram of a plumbing system in accordance with the present invention, generally showing hot water source and conduit means, in communication with at least one plumbing fixture, along with a pump, flow switch, and a controller.

Turning now to FIG. 1, there is shown a hot water recovery system 10 which generally includes a hot water source 12, such as a gas or electric hot water heater, connected to a plumbing fixture such as a sink 14 by a hot water delivery line 16. It is to be appreciated that the hot water source 12 may be a conventional heater 12 as shown or an apparatus as described in U.S. Pat. No. 4,798,224, entitled "Automatic Hot Water Recovery System," or that shown in U.S. Pat. No. 5,042,524, entitled "Demand Recovery System". Also provided in the conventional manner is a cold water delivery line 18 interconnecting the sink 14 with a cold water source 20 which is also interconnected with the hot water source 12 via a feed line 22.

Optional plumbing fixtures such as sinks 28, 30 and washing machine 32 may be provided along with any other common plumbing fixture utilized in residences and businesses, all such fixtures being connected in a parallel configuration with the hot water delivery line 16 and cold water delivery line 18 by feed lines 40 and 42, respectively. At a selected plumbing fixture, such as the sink 14 which is most remote from the hot water source 12, a pump 46 is interconnected between the hot water delivery line 16 and the cold water delivery line 18 via the feed lines 40 42 respectively. The pump provides means for circulating water from the hot water delivery line 16 through the cold water delivery line 18 and back into the hot water source 12 via line 22, by utilizing the cold water delivery line as a return feeder to the hot water source 12. No separate circulation line need be implemented in new systems. In order for the pump 46 to effect flow in a reverse manner through the cold water delivery line 18 and into the hot water tank 12, the pump 46 must, of course, develop sufficient head to overcome existing water pressure in the line.

The hot water delivery system 10 of the present invention can be used in conjunction with an existing system, which may include the hot water source 12, hot and cold water delivery lines 16 18, and a plumbing fixture 14. In this instance, the pump 46 and controller 50, to be described hereinafter in greater detail, may be installed approximately fixture 14 without disturbing the remainder of the existing plumbing system. The advantages of this embodiment are significant in that no unwanted disruption of the housing or business structure is needed in order to implement the hot water recovery system in accordance with the present invention.

The control system 50, which may be of any common electrical type employing relays or solid state electronics or microchips, provides a means for switching electrical current outlet 52 to the pump 46 in order to cause the pump 46 to circulate water from the hot water line 16 to the cold water line 18.

A temperature sensor 54 is disposed in a line 56 interconnecting the pump 46 with the hot water delivery line 16 through the feeder 40, providing means for causing the control means to stop the pump 46 to prevent heated water from being circulated through the cold water delivery line 18 as will be hereinafter described. The temperature sensor 54 may be of a conventional type inserted into the line 56 for water flow thereover, or it may be a thermistor type of detector strapped to the outside of the line 56. The sensor 54 may be of a type for detecting a selected water temperature and in response thereto causing the control system to stop the pump 46.

However, it has been found that the sensitivity of such sensors may not be sufficient to prevent unwanted hot water from entering the cold water delivery line 18. Thus, the preferred embodiment of the present invention is a temperature sensor 54 which is configured for detecting a temperature increase, or gradient, such as one or two degrees and in response thereto, causing the control system 52 stop 46. Thus, no matter what the actual temperature of the water in the line 56 is, an increase of one or two degrees will cause the pump 46 to stop. The pump 46 is started through the control system 50 by means of optional manual switches 60 electrically connected to the control system 50 by way of wires 62 for causing the control system to turn on the pump 46, the control system in this manner acting as a relay switch. Alternatively, to reduce electrical wiring costs, a flow detector 64 may be disposed in the hot water delivery line 18 at any position and connected to the control system by an electrical wire 66 for causing the control system 52 to turn on the pump 46 in response to a detection of a water flow in the hot water delivery line 18.

Although the flow detector 64 is shown adjacent to the hot water source 12, it may be alternatively disposed in the line 40 beneath the fixture 14 for reducing the electrical interconnection required and for enabling all of the apparatus of the present invention to be disposed beneath the fixture 14. Either the manual switches 60 or flow detector 64 enables the control means 52 to turn on the pump 46 when a hot water valve 70 on the fixture 14 is turned on, thus causing a flow in the hot water delivery line 18.

It should be appreciated that if the pump 46 is not a positive displacement type which does not allow water to flow in a reverse manner through it, then a one-way valve 70 should be provided to prevent such flow and preferably a solenoid 72, controlled by the control system 50, should be inserted upstream of the pump 46 to prevent water flow through the pump 46 when the control system 50 turns off pump 46.

It should also be appreciated that the temperature sensor 52 should be disposed in the hot water line or attached to it as hereinbefore described to prevent a rescission between the hot water delivery line 16 and the cold water delivery line 18. However, the pump can be located anywhere throughout the system 10 between the hot water delivery line 16 and cold water delivery line 18.

In another embodiment of the present invention, a microphone 80 may be attached to the hot water delivery line 16 which provides a sound sensing means for detecting water flow in the hot water delivery line 16 and generating a control signal corresponding thereto which is fed into the control system 50 in order to turn on the pump 46 as hereinabove described.

In addition, a sound-producing element 82 may be installed in the hot water delivery line 16, preferably proximate to hot water source 12, for generating a characteristic sound in response to water flow in the hot water delivery line 16.

Such an element may include any rotatable device such as a propeller, not shown, which produces a sound when rotated by water flowing therepast. However, any suitable sound-generating element 82 may be utilized in the present invention. Since the sound naturally travels through the delivery line 16 with water therein, no separate wiring is necessary, and the microphone 80 is preferably configured in any conventional manner for being sensitive to the sound generated by the element 82.

Figure 2:
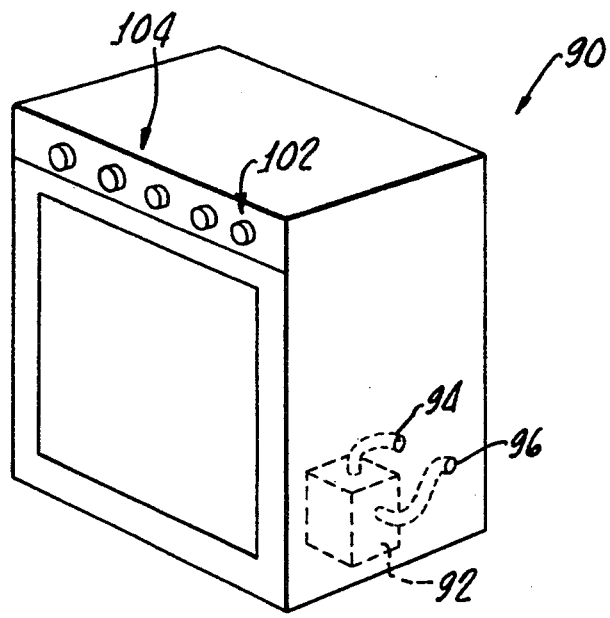
FIG. 2 is a representation of a hot water appliance, such as a dishwasher or clothes washer, in combination with an accelerated hot water delivery system.

Turning now to FIG. 2, there is shown hot water appliance 90 in accordance with the present invention incorporating an accelerated hot water delivery system 92.

The appliance 90 may be any conventional dishwasher or clothes washer having fittings 94, 96 for both hot and cold water supplies (not shown).

Figure 3:
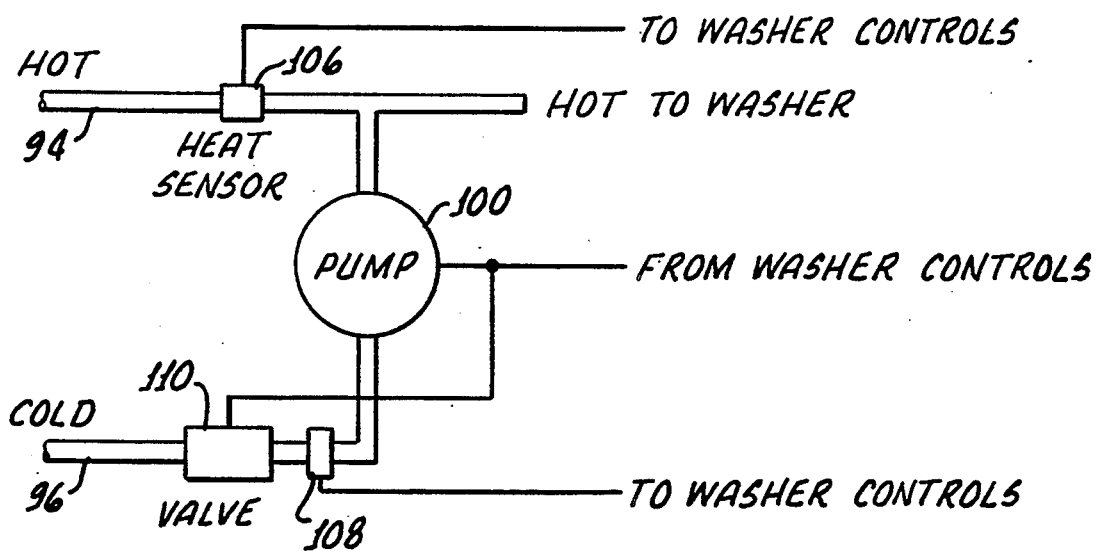
FIG. 3 is a flow diagram of the accelerated hot water delivery system shown in FIG. 2.

In general, and as hereinabove described, the hot water delivery system 92 generally includes a pump 100 (See FIG. 3) interconnected between the hot and cold water fittings for circulation of water from the hot water fitting into the cold water fitting. Control means 102 are incorporated into a control panel 104 on the appliance 90 for causing the pump 100 to circulate water from the hot water fitting 94 into the cold water fitting when the hot water appliance 90 is turned on. Thus, the pump 100 may be activated by turning on the appliance 90.

A heat sensor 106 disposed in or adjacent to the hot water fitting 94 provides a signal to the washer controls that hot water is available, and the washer controls then begin a conventional cycle.

In addition, a temperature sensor 108 may be provided in or adjacent to the cold water fitting 96 for determining the temperature of water being circulated from the hot water fitting 94 to the cold water fitting 96 and thereby generating a signal to the washer control for turning a valve 110 off to prevent heated water from being continuously circulated in the cold water fitting 96.

Alternatively, the valve 110 may be operated without a separate sensor 108 if the main sensor 106 is configured for supplying a signal corresponding to a range of temperatures in the hot water fitting 94.

Although there has been hereinabove described a particular arrangement of a hot water recovery system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A hot water appliance with accelerated hot water delivery system comprising:
   an appliance utilizing hot water and having fittings for both hot and cold water;
   pump means, interconnected between said hot and cold water fittings at a point remote from hot water source and disposed within said appliance, for circulation of water from the hot water fitting into the cold water fitting;
   control means for causing the pump to circulate water from the hot water fitting into the cold water fitting and back to a hot water source when a hot water valve in said appliance is turned on; and
   temperature sensor means, connected to said control means, for causing said control means to stop the pump means to prevent heated water from being circulated into the cold water fitting.

2. The hot water appliance according to claim 1 further comprising switch means, connected to said control means, for causing the control means to turn on the pump means.

3. The hot water appliance according to claim 1 further comprising flow detection means, for detecting water flow through the hot water fitting and in response thereto causing the control means to turn on the pump means.

4. The hot water appliance according to claim 1 wherein said temperature sensor means comprises means for detecting a selected water temperature in the cold water fitting and in response thereto causing the control means to stop the pump means.

5. The hot water appliance according to claim 1 wherein said temperature sensor means comprises means for detecting a temperature increase and in response thereto causing the control means to stop the pump means.

6. The hot water appliance according to claim 5 wherein said pump means comprises a positive displacement pump for preventing backflow therethrough when the pump means is stopped.

7. A hot water demand system comprising:
   a hot water source;
   a hot water delivery line connected between said hot water source and at least one plumbing fixture;
   a cold water delivery line connection between said plumbing fixture, a cold water source and said hot water source;
   an appliance utilizing hot water and having hot and cold water fittings connected to said hot water delivery line and said cold water delivery line respectively;
   pump means, interconnected between said hot and cold water fittings and disposed within said appliance and interconnected between said hot and cold water fittings, for circulation of water from the hot water delivery line through the cold water delivery line and into the hot water source;
   control means for causing the pump means to circulate water from the hot water line into the cold water line within said appliance and back to the hot water source when a hot water valve in said appliance is turned on; and
   temperature sensor means, connected to said control means, for causing said control means to stop the pump means to prevent heated water from being circulated through the cold water delivery line.

8. The hot water recovery system according to claim 7 wherein said temperature sensor means is disposed in a water line connecting the hot water delivery line and the pump means.

9. The hot water recovery system according to claim 8 wherein said temperature sensor means comprises means for detecting a selected water temperature and in response thereto causing the control means to stop the pump means.

10. The hot water recovery system according to claim 8 wherein said temperature sensor means comprises means for detecting a temperature increase and in response thereto causing the control means to stop the pump means.

11. The hot water recovery system according to claim 10 wherein said pump means comprises a positive displacement pump for preventing backflow therethrough when the pump means is stopped.

* * * * *